(12) United States Patent
Kim et al.

(10) Patent No.: US 10,702,060 B2
(45) Date of Patent: Jul. 7, 2020

(54) BATHROOM MANAGEMENT APPARATUS

(71) Applicant: LG ELECTRONICS INC., Seoul (KR)

(72) Inventors: Jeongyun Kim, Seoul (KR); Seongho Kim, Seoul (KR); Ungje Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/913,416

(22) Filed: Mar. 6, 2018

(65) Prior Publication Data

US 2018/0249827 A1 Sep. 6, 2018

(30) Foreign Application Priority Data

Mar. 6, 2017 (KR) ........................ 10-2017-0028493

(51) Int. Cl.
*A47B 55/00* (2006.01)
*A47B 47/00* (2006.01)
(Continued)

(52) U.S. Cl.
CPC .......... *A47B 47/0091* (2013.01); *A47B 55/00* (2013.01); *A47B 57/58* (2013.01);
(Continued)

(58) Field of Classification Search
CPC ..... A47B 47/0091; A47B 55/00; A47B 57/58; A47B 67/005; A47B 81/00; F16B 1/00; F24F 13/0604; F24H 3/022; F25D 11/00
(Continued)

(56) References Cited

U.S. PATENT DOCUMENTS 1,941,126 A 12/1933 Blackman
2,419,226 A 4/1947 Palmer
(Continued)

FOREIGN PATENT DOCUMENTS

CN 101530297 A 9/2009
CN 201891033 U 7/2011
(Continued)

OTHER PUBLICATIONS

U.S. Office Action dated Sep. 18, 2019 issued in U.S. Appl. No. 15/913,154.
(Continued)

*Primary Examiner* — James O Hansen
(74) *Attorney, Agent, or Firm* — KED & Associates LLP

(57) ABSTRACT

Disclosed is a bathroom management apparatus having a storage space for various function modules, and capable of dividing the storage space into various sizes. The bathroom management apparatus may include a cabinet, a frame installed in the cabinet to reinforce stiffness of the cabinet; and a function module may include a towel care module. The function module includes an outer case configured to provide a storage space, a back plate provided inside the outer case to form a rear surface of the storage space, and an attachment groove being formed at a front surface at the back plate, a metal plate disposed at a rear surface of the back plate, and a partition removably coupled to the front surface of the back plate to divide the storage space. The partition may include an attachment protrusion configured for insertion into the attachment groove and a magnet coupled to the metal plate.

20 Claims, 13 Drawing Sheets

(51) Int. Cl.
*A47B 81/00* (2006.01)
*F25D 11/00* (2006.01)
*F16B 1/00* (2006.01)
*A47B 57/58* (2006.01)
*A47B 67/00* (2006.01)
*F24H 3/02* (2006.01)
*F24F 13/06* (2006.01)
*F24F 1/02* (2019.01)
*F24F 3/16* (2006.01)
*A47B 96/20* (2006.01)
*A47B 95/00* (2006.01)

(52) U.S. Cl.
CPC ............ *A47B 67/005* (2013.01); *A47B 81/00* (2013.01); *F16B 1/00* (2013.01); *F24F 13/0604* (2013.01); *F24H 3/022* (2013.01); *F25D 11/00* (2013.01); *A47B 95/008* (2013.01); *A47B 96/20* (2013.01); *A47B 2096/208* (2013.01); *F16B 2001/0035* (2013.01); *F24F 1/02* (2013.01); *F24F 3/16* (2013.01)

(58) Field of Classification Search
USPC ..... 312/236, 107, 108, 257.1, 224, 245, 351
See application file for complete search history.

(56) References Cited

U.S. PATENT DOCUMENTS

| | | |
|---|---|---|
| 2,598,917 A | 6/1952 | Ingram |
| 3,054,194 A | 9/1962 | Hayes |
| 3,306,689 A * | 2/1967 | Isaacson ................ B65D 25/00 312/199 |
| 3,515,450 A * | 6/1970 | Jaecke ............... A47B 47/0075 312/245 |
| 3,519,318 A | 7/1970 | Hagen |
| 3,521,936 A | 7/1970 | Coker, Jr. |
| 3,955,922 A | 5/1976 | Moulthrop |
| 4,134,625 A | 1/1979 | Palka |
| 4,189,195 A | 2/1980 | Turney |
| 4,195,416 A | 4/1980 | Hall |
| 4,239,310 A | 12/1980 | Benjamin |
| 4,644,136 A | 2/1987 | Watchman |
| 5,108,162 A | 4/1992 | Lund |
| 5,255,971 A | 10/1993 | Aisley |
| 5,355,627 A | 10/1994 | Katz |
| 5,380,981 A | 1/1995 | Feldman |
| 5,444,984 A | 8/1995 | Carson |
| 5,487,877 A | 1/1996 | Choi |
| 5,524,980 A * | 6/1996 | Carter .................. A47B 67/02 211/88.01 |
| 5,577,819 A | 11/1996 | Olsen |
| 6,089,685 A * | 7/2000 | Ryan ..................... A47B 67/04 312/291 |
| 6,365,876 B1 | 4/2002 | Park |
| 6,420,682 B1 | 7/2002 | Sellgren |
| 6,525,298 B1 * | 2/2003 | Hunts .................... A47K 10/06 219/385 |
| 6,640,581 B1 | 11/2003 | Choi |
| 6,664,513 B1 | 12/2003 | Park |
| 6,769,197 B1 | 8/2004 | Tai |
| 7,083,110 B2 | 8/2006 | Kim |
| 7,258,606 B1 | 8/2007 | Reid |
| 7,543,339 B1 | 6/2009 | Harris |
| 8,166,667 B1 | 5/2012 | Lora |
| 8,517,478 B2 * | 8/2013 | Diemel .................. A47B 67/02 312/227 |
| 9,013,071 B1 | 4/2015 | Levi |
| 9,644,834 B2 | 5/2017 | Cano |
| 2003/0042828 A1 | 3/2003 | Bonin |
| 2005/0052100 A1 | 3/2005 | Horning |
| 2005/0167563 A1 | 8/2005 | Delaney |
| 2005/0264141 A1 | 12/2005 | Whitall |
| 2006/0272170 A1 | 12/2006 | Holmes |
| 2007/0278755 A1 | 12/2007 | Horning |
| 2008/0252189 A1 | 10/2008 | Regan |
| 2009/0255891 A1 * | 10/2009 | Lanning ................. A47B 96/04 211/183 |
| 2010/0224615 A1 * | 9/2010 | Gallo .................... A47K 10/06 219/385 |
| 2011/0133572 A1 | 6/2011 | Levi |
| 2012/0074121 A1 * | 3/2012 | Gagas ................. A47J 36/2483 219/385 |
| 2014/0210331 A1 * | 7/2014 | Tunzi ..................... F25D 25/00 312/404 |
| 2015/0374121 A1 | 12/2015 | Wood |
| 2016/0211689 A1 | 7/2016 | Wang |
| 2017/0181541 A1 | 6/2017 | Stanley, Jr. |
| 2018/0110382 A1 | 4/2018 | Jeon |
| 2018/0249826 A1 | 9/2018 | Kim |
| 2018/0249827 A1 | 9/2018 | Kim |
| 2019/0087788 A1 | 3/2019 | Murphy |

FOREIGN PATENT DOCUMENTS

| | | |
|---|---|---|
| CN | 202082204 U | 12/2011 |
| CN | 202235010 U | 5/2012 |
| CN | 103211400 A | 7/2013 |
| CN | 204146645 U | 2/2015 |
| CN | 204612300 U | 9/2015 |
| CN | 105286684 A | 2/2016 |
| IT | 1130948 | 6/1986 |
| WO | WO 80/01872 | 9/1980 |

OTHER PUBLICATIONS

U.S. Appl. No. 15/913,154, filed Mar. 6, 2018.
U.S. Appl. No. 15/913,257, filed Mar. 6, 2018.
U.S. Appl. No. 15/913,416, filed Mar. 6, 2018.
U.S. Notice of Allowance dated Nov. 15, 2019 issued in U.S. Appl. No. 15/913,257.
Chinese Office Action dated Mar. 19, 2020 issued in Application 201810184407.2 and English language translation.
Chinese Office Action dated May 7, 2020 issued in Application 201810182433.1 and English Translation.

* cited by examiner

FIG. 13
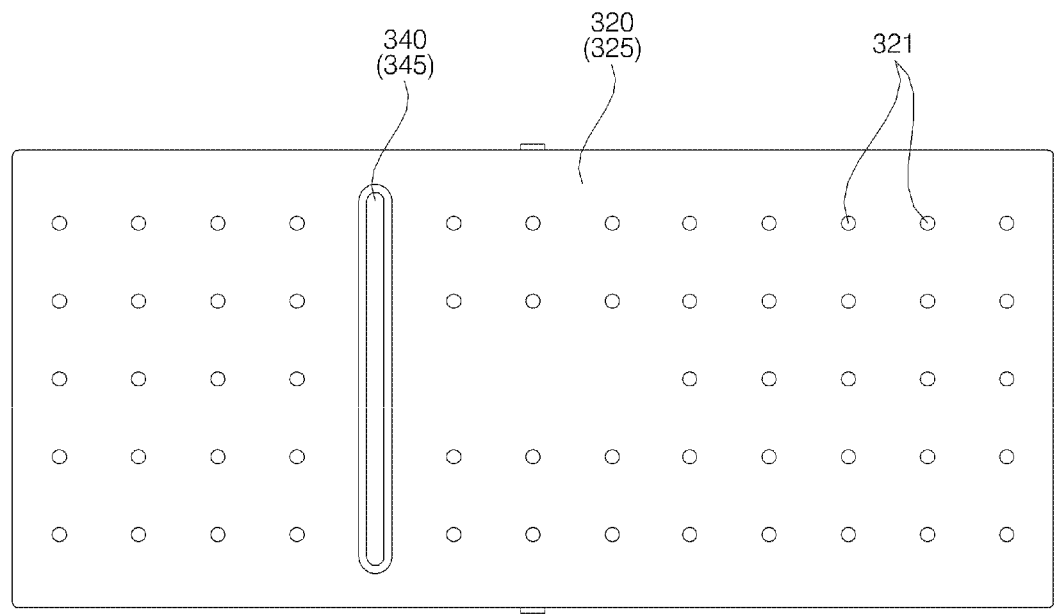
(a)
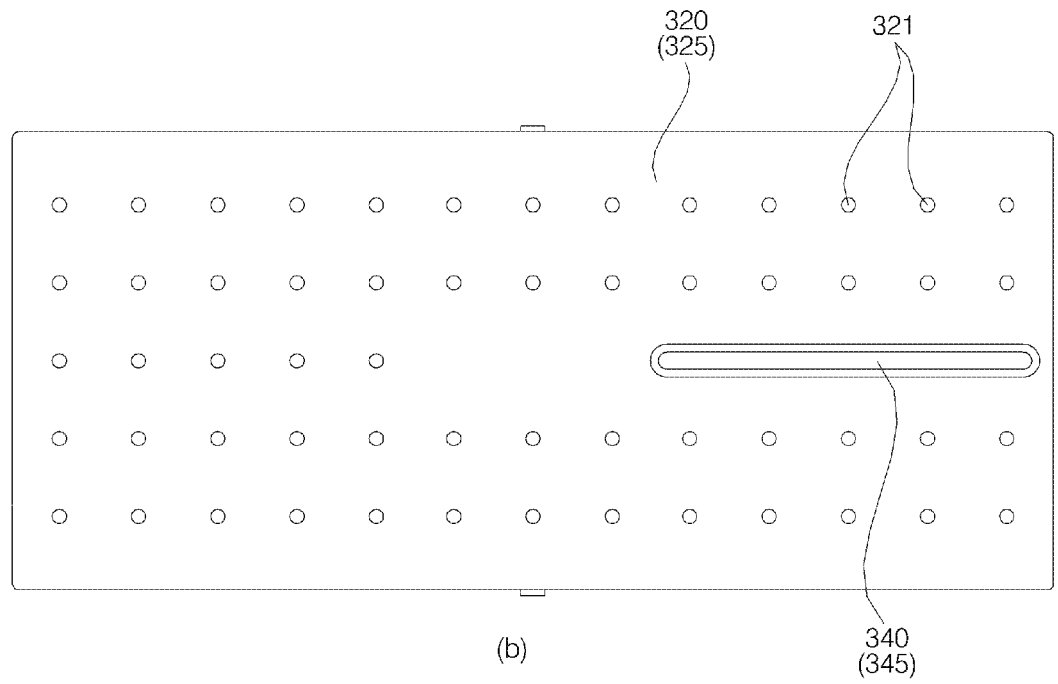
(b)

BATHROOM MANAGEMENT APPARATUS

CROSS-REFERENCE TO RELATED APPLICATION(S)

This application claims the priority benefit of Korean Patent Application No. 10-2017-0028493, filed in Korea on Mar. 6, 2017 in the Korean Intellectual Property Office, the disclosure of which is incorporated herein by reference.

U.S. application Ser. Nos. 15/913,154; 15/913,257; and 15/913,416, are related and are hereby incorporated by reference in their entirety. Further, one of ordinary skill in the art will recognize that features disclosed in these above-noted applications may be combined in any combination with features disclosed herein.

BACKGROUND

1. Field

A bathroom management apparatus having functional modules that provide storage space and removes humidity is disclosed.

2. Background

Bathroom management apparatus having functional modules are known. However, they suffer from various disadvantages.

BRIEF DESCRIPTION OF THE DRAWINGS

Embodiments will be described in detail with reference to the following drawings in which like reference numerals refer to like elements, and wherein:

FIG. 13 is a view illustrating states of the first partition and the second partition attached to the back plate.

DETAILED DESCRIPTION

Figure 1:
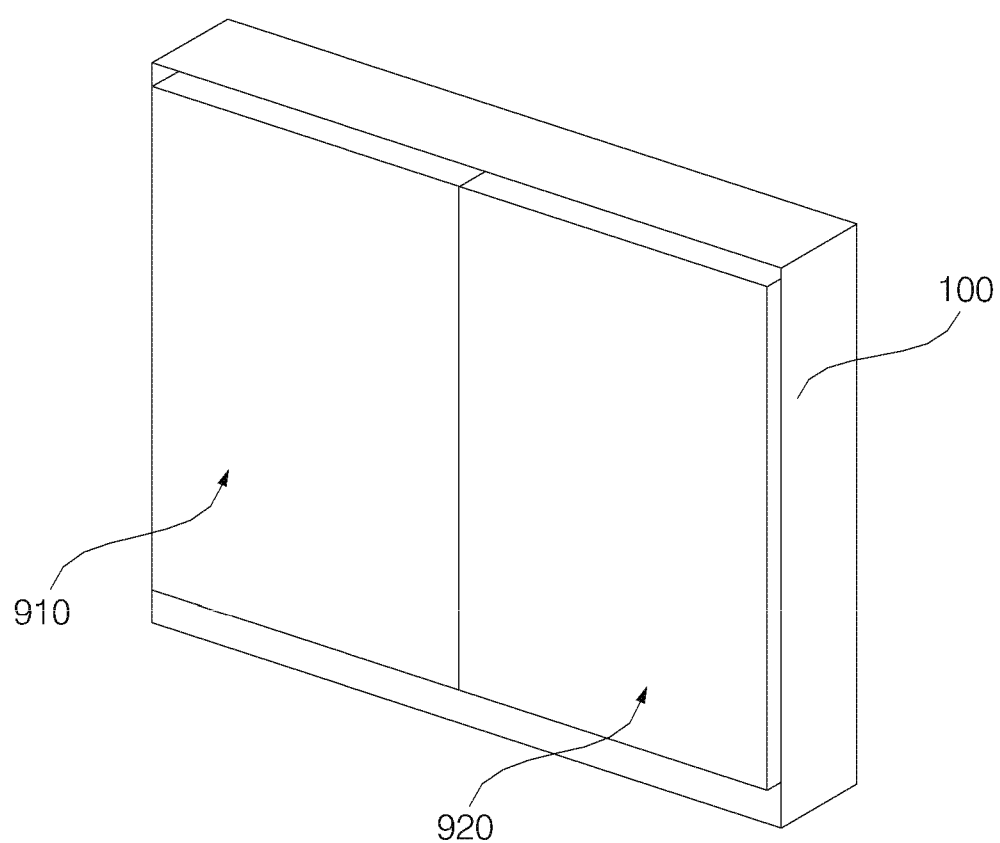
FIG. 1 is a perspective view showing a bathroom management apparatus according to an embodiment of the present disclosure.

Hereinafter, a bathroom management apparatus according to embodiments of the present disclosure will be described in detail with reference to the accompanying drawings.

In general, a bathroom is a place that allows users to wash his/her clothes, face, hands, shower, or the like. Since the bathroom is a very humid place, molds and bacteria may easily breed and may result in unwanted odors.

Most bathrooms dry and deodorize mainly relying on a ventilation fan. However, since an operation of the ventilation fan may not suitable or may be inadequate to dry the whole bathroom even with constant operation, the ventilation fan alone may be inadequate to control mold and the bacteria. Accordingly, it is important to prevent the bathroom from becoming a habitat of the molds and the bacteria by removing moisture early on, particularly at low lying areas of the bathroom, as well as promptly drying wet bath and toilet appliances such as wet towels.

Further, various facilities such as washstand, toilet, mirror, towel rack, toothbrush holder, as well as a storage space (or storage room) for storing various bath and toilet appliances including towels or the like, may be provided in the bathroom. Meanwhile, a user may use various types of electronic products such as hair dryers and shavers in the bathroom.

Hence, if a bathroom management apparatus can integrate multiple functions such as a toothbrush sterilizer, a cosmetics refrigerator, a charging function for electronic products, as well as drying or dehumidifying functions to address multiple needs in the bathroom, the space in the bathroom can be more effectively used.

Further, if a bath management apparatus can be customized to select only desired functions among various function modules including, for example, a storage module having a function for storage, an air conditioning module having a function to dry objects in the bathroom, a sterilizing module having a function of a toothbrush sterilizer, a refrigerating module having a function of a cosmetics refrigerator, and a charging module having a charging function for the electronic products, or the like, the effectiveness and usability of the bathroom management apparatus may be improved.

In addition, an installation position of the function modules may be freely changed by taking into consideration available storage space, convenience and usability to the user. Since a toilet, a washstand, and a mirror may each be installed in different locations in the bathroom, the installation position of the function module may be freely changed according to the applicable environment of the bathroom.

Meanwhile, a storage space of a storage room installed in a bathroom may be divided by a partition. However, since the partition is fixed to the storage room, the size of the storage space is fixed which may be inconvenient to the use. Further, the storage room does not have a function of drying and warming storage objects but is used simply for storing the storage objects. These and other disadvantages are addressed in the bathroom management apparatus of the present disclosure.

A first objective of the present disclosure provides a bathroom management apparatus capable of dividing a storage space of a function module into various sizes.

A second objective of the present disclosure provides a bathroom management apparatus capable of drying and warming storage objects stored in a storage space of a function module.

The bathroom management apparatus as broadly described and embodied herein addresses these as well as other aspects.

Figure 2:
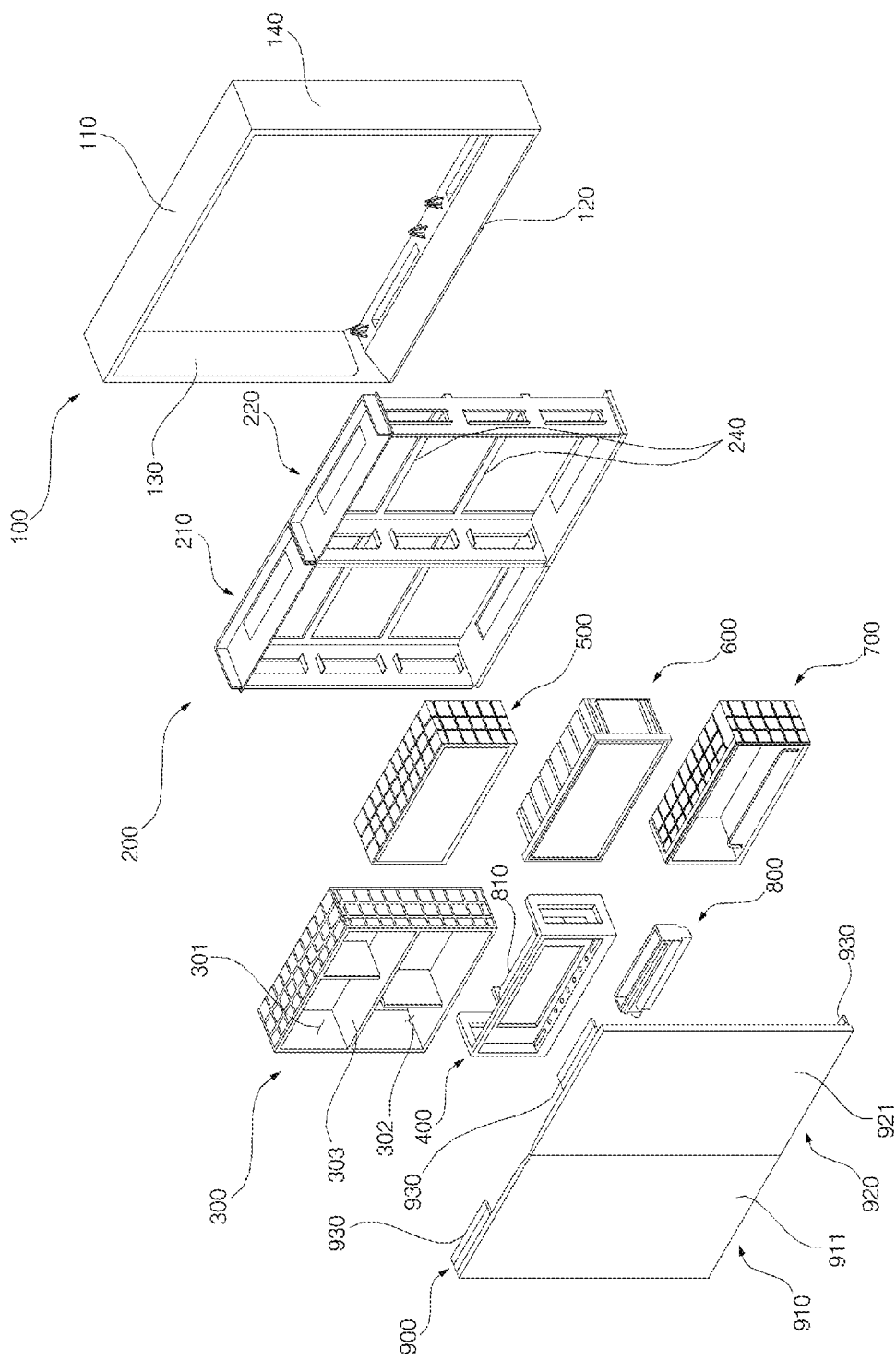
FIG. 2 is an exploded perspective view showing a bathroom management apparatus of FIG. 1.

FIG. 1 is a perspective view showing a bathroom management apparatus according to one embodiment of the present disclosure, and FIG. 2 is an exploded perspective view showing a bathroom management apparatus of FIG. 1.

The bathroom management apparatus may include a cabinet 100, a frame 200 installed inside the cabinet 100, a plurality of function modules 300, 400, 500, 600, 700, and 800, and a door 900 disposed in a forward direction of the cabinet 100.

The cabinet 100 may have a hollow structure and may have a square shape of which a front surface and a rear surface are open. The cabinet 100 may form an upper external appearance, a lower external appearance, a left external appearance, and a right external appearance.

The cabinet 100 may include an upper panel 110 forming an upper side, a lower panel 120 forming a lower side, a left side panel 130 forming a left side, and a right side panel 140 forming a right side. The upper panel 110 connects a top end of the left side panel 130 with a top end of the right side panel 140. The lower panel 120 connects a bottom end of the left side panel 130 with a bottom end of the right side panel 140.

A left end of the upper panel 110 may be coupled with a top end of the left side panel 130 and a right end of the upper panel 110 may be coupled with a top end of the right side panel 130. Further, a left end of the lower panel 120 may be coupled with a lower end of the left side panel 130, and a right end of the lower panel 120 may be coupled with a bottom end of the right side panel 140.

The frame 200 may include frame bodies 210 and 220 having a square shape corresponding to the cabinet 100 of which a front surface and a rear surface are open, and back brackets 240 disposed in a rearward direction of the frame bodies 201 and 220 to be coupled with rear surfaces of the frame bodies 210 and 220. The frame bodies 210 and 220 reinforce stiffness of the cabinet 100. The bracket 240 may be thicker than the frame bodies 210 and 220 to reinforce the stiffness of the frame bodies 210 and 220.

The frame bodies 210 and 220 provide a space for multiple function modules 300, 400, 500, 600, 700, and 800. The function modules 300, 400, 500, 600, 700, and 800 include a towel care module 300 (or towel warmer), a sterilizing module 400 (or sterilizer), a secret box module 500 (or lock box), a refrigerating module 600 (or refrigerator), a charging module 700 (or device charger), and a blower out module 800 (or blower module, vane assembly). The towel care module 300, the sterilizing module 400, the secret box module 500, the refrigerating module 600, the charging module 700, and the blower module 800 may be independently provided and installed inside the frame bodies 210 and 220 as module units. Ribs protrude from upward, downward, left and right sides of the function modules 300, 400, 500, 600, 700, and 800, respectively. The ribs protrude from left and right sides of the function modules 300, 400, 500, 600, 700, and 800 may be supported by an inner rib 215 to be described later protruding in the frame bodies 210 and 220.

The towel care module 300 may be installed with a function division plate 303. The function division plate 303 divides an inner space of the towel care module 300. The towel care module 300 may include a first storage space 301 for storing towels at a top side of the function division plate 303 and a second storage space 302 for storing the towels at a bottom side of the function division plate 303, and configured to dry and warm the stored towels. The towel care module 300 may include a first independent towel care module having only the first storage space 301 without the function division plate 303 and a second independent towel care module having only the second storage space 302.

The sterilizing module 400 may be used as a toothbrush sterilizer. The sterilizing module 400 may be installed therein with toothbrushes, and may be installed therein with a lamp for irradiating ultra violet ray to the toothbrushes. A blower module 800 may be installed at a bottom side of the sterilizing module 400. An air conditioning module 810 (or dryer) including a blower for sucking and blowing air to the blower module 800 and a heater for heating the air blown from the blower is installed at a rearward direction of the sterilizing module 400 corresponding to a top side of the blower module 800 so that the sterilizing module 400 and the air conditioning module 810 may be integrally formed. The blower module 800 may exhaust the air blown from the blower into an inside of the bathroom.

The secret box module 500 may be used as storage for storing objects to prohibit children and customers to see or touch. The secret box module 500 may be a lock box, or the like, and may be secured.

The refrigerating module 600 may be used as usage for refrigerating medicines and cosmetics. The refrigerating module 600 may be installed with a thermoelectric module for supplying cold air into the refrigerating module 600 and for emitting warm air to an outside of the refrigerating module 600.

The charging module 700 may be used as usage for charging electronic devices such as a hair dryer and an electric shaver. The charging module 700 may be installed therein with a holder for holding the hair dryer and with a receptacle in which a power plug of the electronic device or a power plug of a charger for charging the electronic device.

Two frame bodies 210 and 220 may be provided and include a first frame body 210 and a second frame body 220 disposed at one side of the first frame body 210. The first frame body 210 and the second frame body 220 have the same structure. The desired modules may be customized based on user need. For example, desired ones among the towel care module 300, the sterilizing module 400, the secret box module 500, the refrigerating module 600, the charging module 700, and the blower module 800 may be selected and installed according to a need of a consumer. For example, only a plurality of towel care modules 300 may be installed, or alternatively, two towel care modules 300 and one refrigerating module 600 may be installed in the frame bodies 210 and 220. According to the number of towel care modules 300, the sterilizing modules 400, the secret box modules 500, the refrigerating modules 600, and the charging modules 700 installed in the frame bodies 210 and 220, one or more frame bodies 210 and 220 may be provided.

The door 900 may form a front external appearance of the bathroom management apparatus. The door 900 opens/closes an open front surface of the cabinet 100. The same number of doors 900 is provided by the corresponding number of the frame bodies 210 and 220. Since the two frame bodies 210 and 220 are provided, two doors 900 are provided to include a first door 910 and a second door 920. The first door 910 may be disposed in a forward direction of the first frame body 210 and opens a left side of an open front surface of the cabinet 100, and the second door 920 may be disposed in a forward direction of the second frame body 220 and opens a right side of an open front surface of the cabinet 100.

Mirrors 911 and 912 may be provided at front surfaces of the first door 910 and the second door 920, respectively. The mirrors 911 and 921 may be used instead of a mirror inside the bathroom. The mirrors 911 and 921 include a first mirror 911 provided at a front surface of the first door 910 and a second mirror 921 provided at a front surface of the second door 920.

A hinge 930 may be installed at a rear surface of the door 900. The hinge 930 may include a first hinge member of which one end is coupled with a rear surface of the door and a second hinge member of which one end is rotatably coupled with an opposite end of the first hinge member and an opposite end is rotatably coupled with the frame bodies 210 and 220. The hinges 930 may be installed at a top side and a lower side of a rear surface of the first door 910, respectively, and may be installed at a top side and a bottom side of a rear side of the second door 910.

Figure 3:
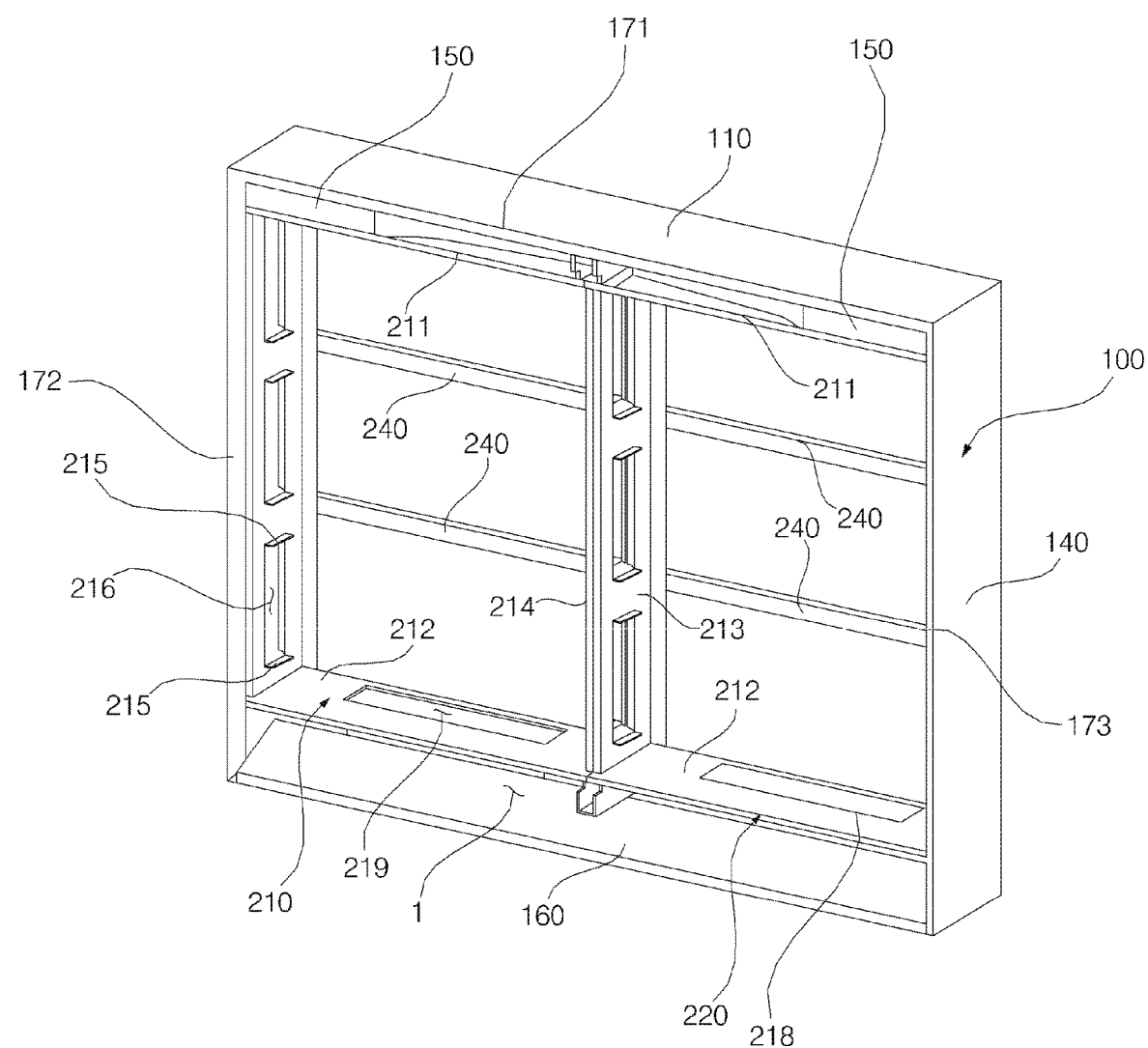
FIG. 3 is a view illustrating a coupled state between the cabinet and the frame.
Figure 4:
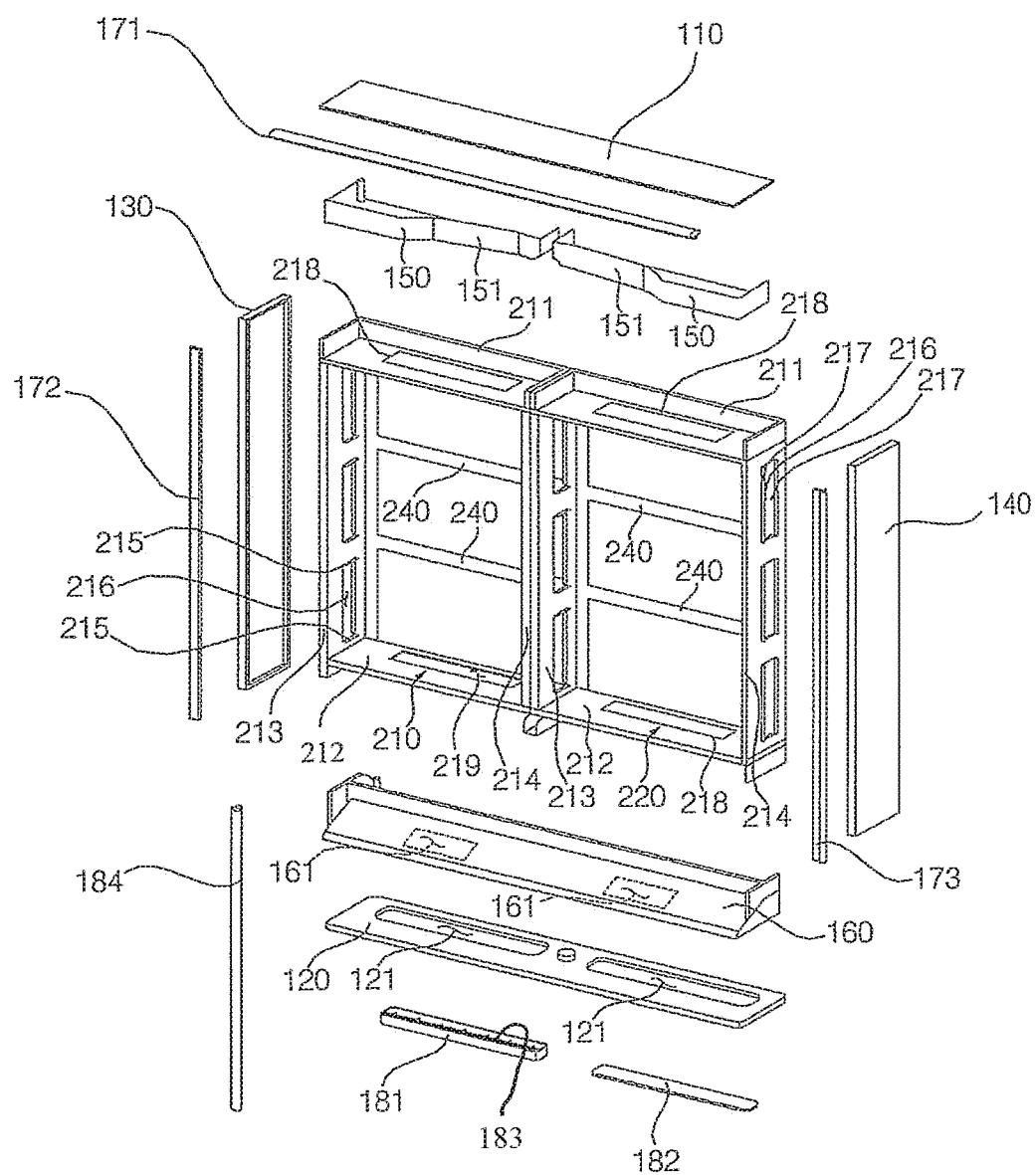
FIG. 4 is an exploded perspective view of FIG. 3.

FIG. 3 is a view illustrating a coupled state between the cabinet and the frame shown in FIG. 3, and FIG. 4 is an exploded perspective view of FIG. 3. Top surfaces and bottom surfaces of frame bodies 210 and 220 may be spaced apart from the cabinet 100. That is, the top surfaces of the frame bodies 210 and 220 may be vertically spaced apart from the upper panel 110 of the cabinet 100, and the bottom surfaces of the frame bodies 210 and 220 may be vertically spaced apart from the lower panel 110 of the cabinet 100.

An upper cover 150 may be disposed at a space between the upper panel 110 of the cabinet 100 and the top surfaces of the frame bodies 210 and 220. The upper cover 150 may be inserted into the space between the upper panel 110 of the cabinet 100 and the top surfaces of the frame bodies 210 and 220 to be coupled with the upper panel 110 of the cabinet 100 and the top surfaces of the frame bodies 210 and 220.

When a door 900 is closed, the upper cover 150 covers the space between the upper panel 110 of the cabinet 100 and the top surfaces of the frame bodies 210 and 220, a hinge 930 installed at a rear top side of the door 900 is not viewable from a rear direction of the bathroom management apparatus through a space between the upper panel 110 and top surfaces of the frame bodies 210 and 220. When the door 900 is open, the upper cover 150 prevents the bathroom wall from being viewed from the forward direction of the bathroom management apparatus through a space between the upper panel 110 and the top surface of the frame bodies 210 and 220. The upper cover 150 may have a shape in which a top surface and a rear surface are open to include a bottom surface, a front surface, a left surface, and a right surface.

A concave groove 151 for receiving a hinge 930 when the door 900 is closed is formed at the front surface of the upper cover 150 so that a space for receiving the hinge 930 may be formed between the upper panel 110 and the top surfaces of the frame bodies 210 and 220.

Further, a control panel 160 may be inserted between the lower panel 120 of the cabinet 100 and bottom surfaces of the frame bodies 210 and 220. The control panel 160 may be inserted between the lower panel 120 of the cabinet 100 and bottom surfaces of the frame bodies 210 and 220 to be coupled with the lower panel 120 of the cabinet 100 and the bottom surfaces of the frame bodies 210 and 220.

Remaining regions of the control panel 160 except for a top side coupled with the bottom surfaces of the frame bodies 210 and 220 may be spaced apart from the bottom surfaces of the frame bodies 210 and 220. Air exhausted from the blower module 800 may be moved into a first air outlet 2 through a space between bottom surfaces of the frame bodies 210 and 220 and a top side of the control panel 160. Hence, after a shower, the user may dry off using air exhausted through the first air outlet 2.

A user interface as well as an input unit for controlling function modules 300, 400, 500, 600, 700, 800, and 810 may be installed at the control panel 160. The input unit may include at least one of a button and a touch screen, and the user pushes or touches the input unit to operate or stop the function modules 300, 400, 500, 600, 700, 800, and 810. An installed region of the input unit of the control panel 160 may be exposed below the door 900 when the door 900 is closed.

Meanwhile, the cabinet 100 may include decoration members 171, 172, and 173 coupled with a front end of the upper panel 110, a front end of the left side panel 130, and a front end of the right side panel 140, respectively. The decoration members 171, 172, and 173 include a first decoration member 171 coupled with a front end of the upper panel 100, a second decoration member 172 coupled with a front end of the left side panel 130, and a third decoration member 173 coupled with a front end of the right side panel 140. The decoration members 171, 172, and 173 are not installed at a front end of the lower panel 120. Instead, the front end of the lower panel 120 may be covered by a front end of the control panel 160. That is, the control panel 160 may function as a decoration members by covering the front end of the lower panel 120. The control panel 160 may be formed with the same color and material as those of the decoration members 171, 172, and 173. The frame bodies 210 and 220 may include an upper frame 211 forming an upper side, a lower frame 212 forming a lower side, and a left side frame 213 forming a left side, and a right side frame 214 forming a right side.

The upper frame 211 connects a top end of the left side frame 213 with a top end of the right side frame 214. The lower frame 212 connects a bottom end of the left side frame 213 with a bottom end of the right side frame 214.

A left end of the upper frame 211 may be coupled with a top end of the left side frame 213, and a right end of the upper frame 211 may be coupled with a top end of the right side frame 214. Further, a left end of the lower frame 212 may be coupled with a bottom end of the left side frame 213, and a right end of the lower frame 212 may be coupled with a bottom end of the right side frame 214.

The upper frame 211 and the lower frame 212 may have the same structure. The left side frame 213 and the right side frame 214 may have the same structure. Accordingly, the frame body 210 and the second frame body 220 may be installed inside the cabinet 100 regardless of upper and lower sides and regardless of left and right sides.

The upper frame 211 may have a shape in which a top surface and a front surface are open and may include a bottom surface, a left surface, a right surface, and a rear surface. Further, the lower frame 212 has a shape that is upside down relative to the upper frame 211 and may include a bottom surface and a front surface which are open. That is, the lower frame 212 may include a left surface, a right surface, and a rear surface.

First opening portions 216 having a square shape may be formed in the left side frame 213 and the right side frame 214, respectively. The first opening portion 216 may form a path through which wires of the function modules 300, 400, 500, 600, 700, and 800 may pass. A same number of first opening portions 216 may be formed corresponding to the number of function modules 300, 400, 500, 600, 700, and 800 installed inside the frame bodies 210 and 220.

Inner ribs 215 may be formed at inner sides of the left side frame 213 and the right side frame 214, respectively. The inner ribs 215 protrudes inward from the frame bodies 210 and 220 at a top side and a bottom side of the first opening portion 216.

The inner rib 215 may guide insertion of the function modules 300, 400, 500, 600, 700, and 800 when the function modules 300, 400, 500, 600, 700, and 800 are individually inserted into the frame bodies 210 and 220. After the function modules 300, 400, 500, 600, 700, and 800 are inserted into the frame bodies 210 and 220, the inner rib 215 may support the function modules 300, 400, 500, 600, 700, and 800.

Outer ribs 217 may be formed at outer sides of the left side frame 213 and the right side frame 214, respectively. The outer ribs 217 may protrude to outer sides of the frame bodies 210 and 220 from a front side and a rear side of the first opening portion 216, respectively.

The outer ribs 217 may be spaced a part from each other in forward and reward directions while interposing the first opening portion 216 therebetween to form a path through which wires of the function modules 300, 400, 500, 600, 700, and 800 pass after the wires of the function modules 300, 400, 500, 600, 700, and 800 pass through the first opening portion 216.

Cut lines 218 having a square shape are formed at a bottom surface of the upper frame 211 and a top surface of the lower frame 212, respectively. The cut lines 218 may be formed by partially cutting a bottom surface of the upper frame 211 and a top surface of the lower frame 212 so that a worker may easily separate an inner region divided by the cut lines 218 from a bottom surface of the upper frame 211 an a top surface of the lower frame 212.

When the sterilizing module 400 is installed close to the upper frame, a worker may cut the cut line 218 formed at the upper frame 211 among the cut line 218 formed at the upper frame 211 and the cut line 218 formed at the lower frame 212 to separate an inner region of the upper frame 211 divided by the cut line 218. When the sterilizing module 400 is installed close to the lower frame, the worker may cut the cut line 218 formed at the lower frame 211 among the cut line 218 formed at the upper frame 211 and the cut line 218 formed at the lower frame 212 to separate an inner region of the lower frame 212 divided by the cut line 218.

The second opening portions 219 may be formed at the upper frame 211 and the lower frame 212 when the inner region divided by the cut line 218 is separated by the worker. Further, a third opening portion 161 may be formed at a lower side of the second opening portion 219 in a lower side of the control panel 160. Further, a fourth opening portion 121 may be formed at a lower side of the third opening portion 161 in a lower panel 120 of the cabinet 100.

A blower louver 181 or a lower cover 182 may be provided at the fourth opening portion 121. The blower louver 181 may be installed at a region corresponding to the fourth opening portion 121 or a lower cover 182 may be installed on the top surface of the lower panel 120. When the fourth opening portion 121 is located under the sterilizing module 400, for example, the blower louver 181 may be installed at a region corresponding to the fourth opening portion 121 in the lower panel 120. Otherwise, a lower cover 182 may be installed at a region corresponding to the fourth opening portion 121 in the lower panel 120 so that the fourth opening portion 121 is shielded by the lower cover 182.

The blower louver 181 may include a discharge grill 183, and may be installed at a region corresponding to the fourth opening portion 121 in the lower panel 120 to guide air from the blower module 800 into the fourth opening portion 121. When the blower louver 182 is installed at a region corresponding to the fourth opening portion 121 in the lower panel 120, the fourth opening portion 121 becomes the second air outlet 121. That is, in the cabinet 100, the first air outlet 2 is spaced apart from a lower frame 212 being a bottom surface of the frame 200, and a second air outlet 121 may be formed at a bottom surface of the frame 200.

The blower module 800 may be disposed inside the control panel 160 between the lower panel 120 and the lower frame 212. Further, a top end of the blower module 800 may be inserted into the second opening portion 219 so that air blown from the blower flows though the blower module 800, and a bottom end of the blower module 800 is connected to the blower louver 181 through the third opening portion 161. Moreover, a front opening portion communicating with the first air outlet 2 may be formed at a front surface of the blower module 800.

Since the blower module 800 may be installed with a motor and a fluid path switching vane rotated by a driving force of the motor, the fluid path switching vane is rotated by the driving force of the motor to open the front opening portion and close a bottom end, such that air flowing from an air conditioning module 810 passes through the front opening portion and is discharged into the bathroom through the first air outlet 2. When the front opening portion is closed and the bottom end is open, the air flowing from the blower passes through the blower louver 181 and is discharged into the bathroom through the second air outlet 121. That is, the blower module 800 switches the direction of air blown from the air conditioning module 810 to one of the first air outlet 2 and the second air outlet 121.

A user may control a rotation position of the fluid path switching vane of the blower module 800 by operating the input unit installed at the control panel 160 to discharge air into the bathroom through the first air outlet 2 or to discharge the air into the bathroom through the second air outlet 121. The air discharged into the bathroom through the first air outlet 2 may be used to dry the user's body. The air discharged into the bathroom through the second air outlet 121 may be used to dry an inside of the bathroom.

Meanwhile, when a plurality of frame bodies 210 and 220 are provided, a center cover 184 may be further installed at front surfaces of adjacent side frames 214 and 213 of the plurality of frame bodies 210 and 220. That is, in the present embodiment, two frame bodies 210 and 220 are provided, center covers 184 may be installed at a front surface of the right side frame 214 of the first frame body 210 and a front surface of a left side frame 213 of the second frame body 220, respectively. The center cover 184 may cover the right side frame 214 of the first frame body 210 and the left side frame 213 of the second frame body 220 in a forward direction. In addition, after the function modules 300, 400, 500, 600, and 700 are inserted into the frame bodies 210 and 220, the center cover 184 may protrude to both sides of the function modules 300, 400, 500, 600, and 700 to cover a module locking rib which is locked at a front surface of the both side frames 213 and 214 of the frame bodies 210 and 220.

Meanwhile, the various sizes of the storage spaces of the function modules 300, 400, 500, 600, and 700 may be divided by partitions 340 and 345 to be described later. That is, the function modules 300, 400, 500, 600, and 700 may include an outer case 310, back plates 320 and 325, metal plates 330 and 335, and partitions 340 and 345 in common. With respect to this, only a towel care module 300 among the function modules 300, 400, 500, 600, and 700 is described as an example as follows.

Figure 5:
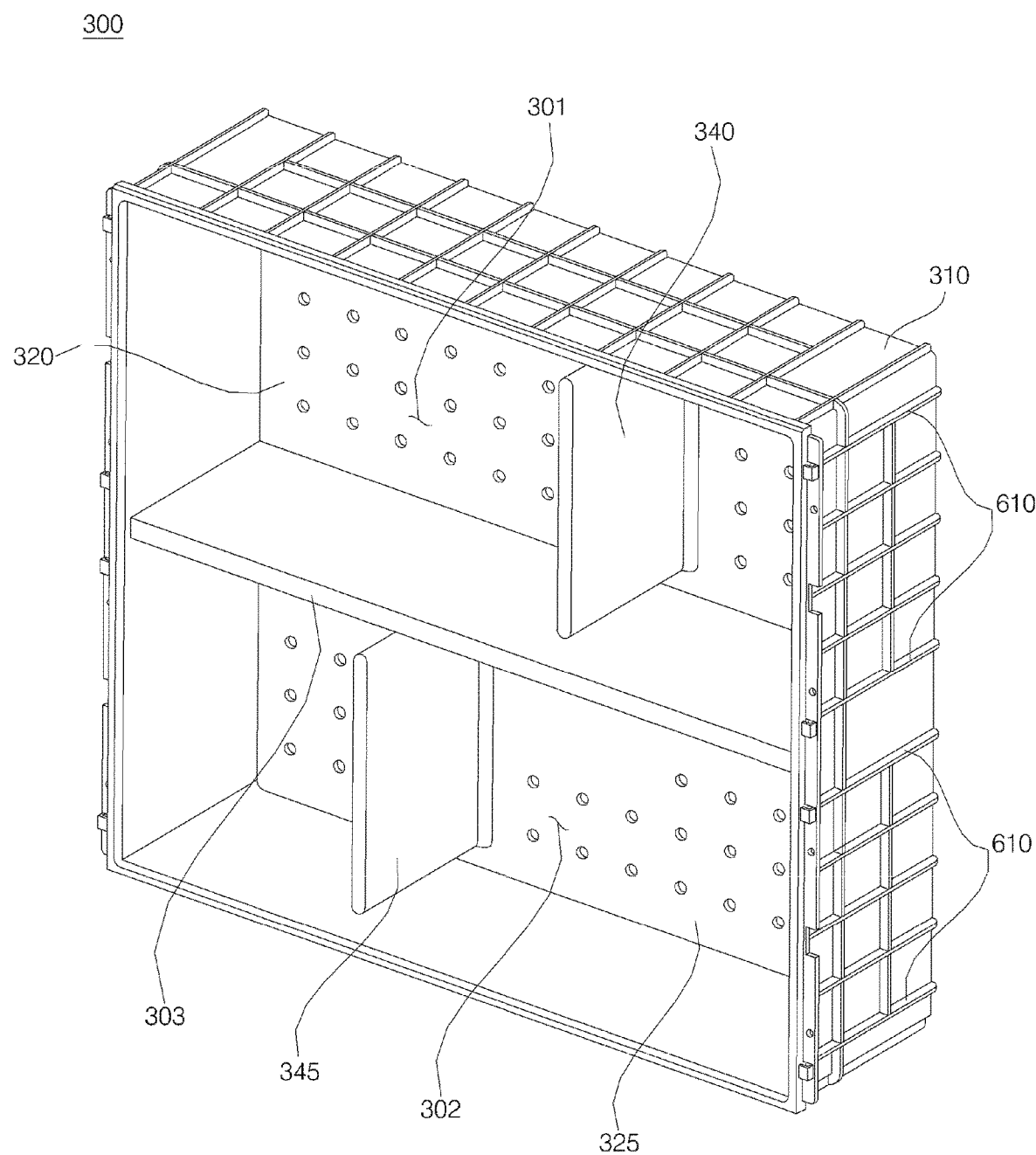
FIG. 5 is a front perspective view illustrating a towel care module shown in FIG. 2.
Figure 6:
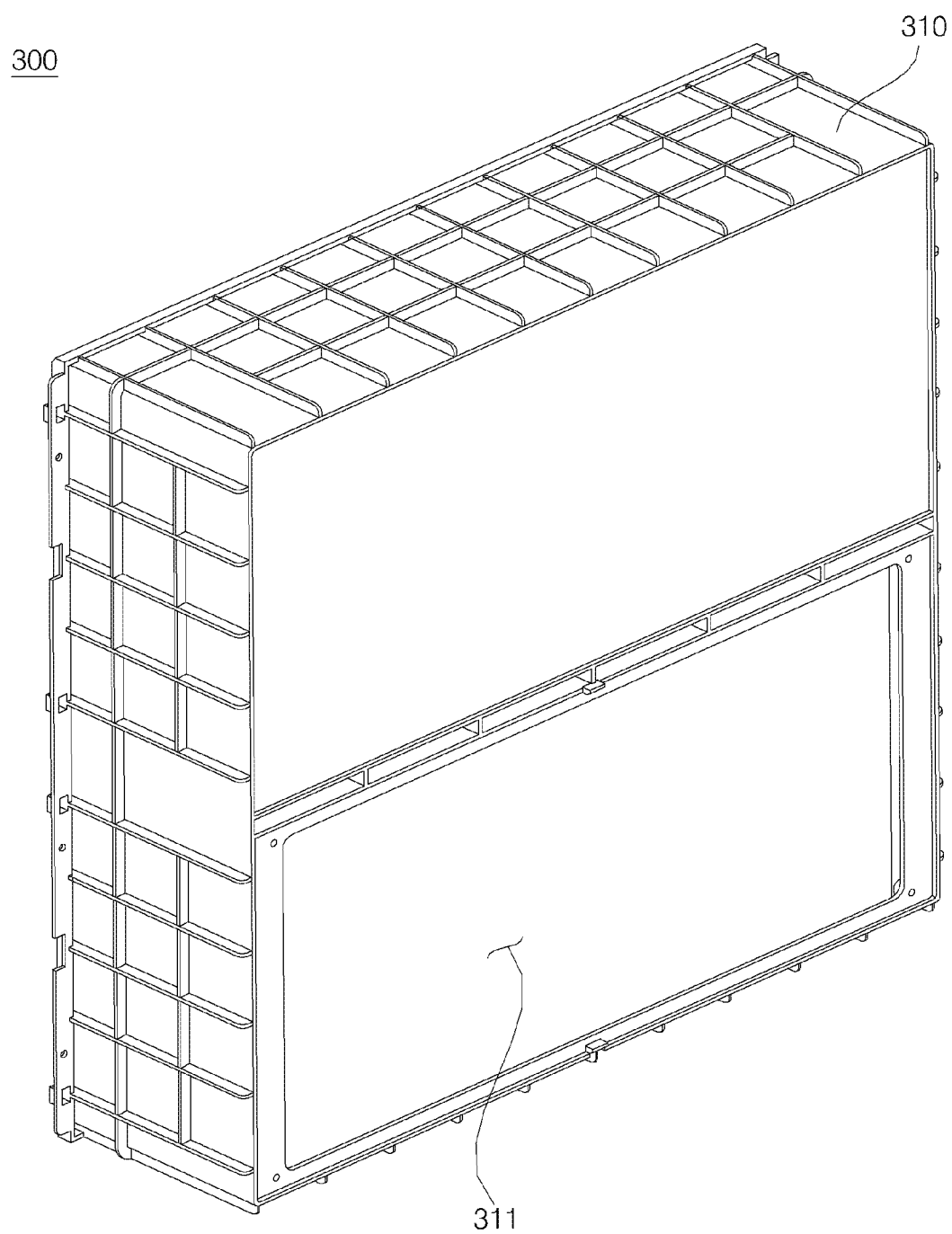
FIG. 6 is a rear perspective view illustrating a towel car module shown in FIG. 2.

FIG. 5 is a front perspective view illustrating a towel care module shown in FIG. 2, and FIG. 6 is a rear perspective view illustrating a towel care module shown in FIG. 2. The towel care module 300 may include an outer case 310 configured to provide storage spaces 301 and 302 of which front surfaces are open; a function division plate 303 configured to form a first storage space 301 at a top side and a second storage space 302 at a bottom side by vertically diving the storage spaces 301 and 302; a first back plate 320 inserted into the outer case 310 to form a rear surface of the first storage space 301; a second back plate 325 inserted into the outer case 310 to form a rear surface of the second storage space 301; a first partition 340 inserted into the outer case 310 to divide the first storage space 301; and a second partition 345 inserted into the outer case 310 to divide the second storage space 301. However, when the towel care module 300 does not include the function division plate 303 in the outer case 310, the first storage space 301 and the second storage space 302 forms one storage space 301 and 302, the first back plate 320 and the second back plate 325 forms one back plate, at least one of the first partition 304 and the second partition 345 is provided so that one storage space 301 and 302 is partitioned.

The outer case has a square shape of which a front surface is open. For example, as illustrated in FIG. 5, the front side of the outer case may be open. When the door 900 opens/closes the open front surface of the cabinet 100, the open front surface of the outer case 310 is opened/closed by the door 900.

Ribs protrude from up, down, left and right sides of the outer case 310. Some of the ribs formed both sides of the outer case 310 becomes a guide rib 610 supported by an inner rib 215 formed at an inner side of the frame 200. When the towel care module 300 is inserted into a mounting space in the frame 200, insertion of the guide ribs 610 formed at both sides of the outer case 310 is guided and the guide ribs 610 is supported by the inner rib 215. When the towel care module 300 is completely mounted in a mounting space of the frame 200, the guide ribs 610 is supported by the inner rib 215 so that the towel care module 300 may be supported while guiding the insertion of the towel care module 300 in a mounting space in the frame 200.

Figure 7:
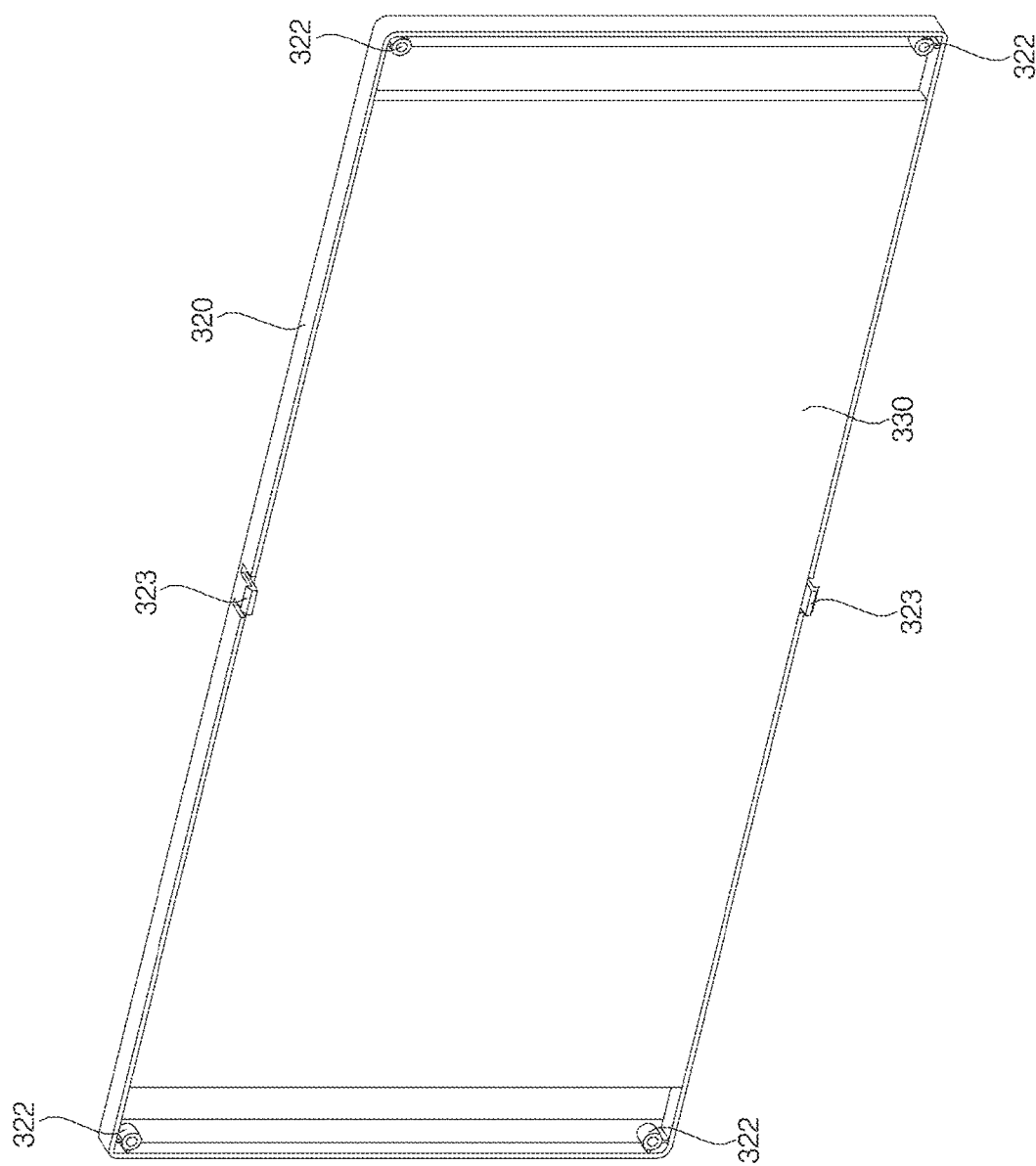
FIG. 7 is a view illustrating a rear surface of a first back plate shown in FIG. 5.
Figure 8:
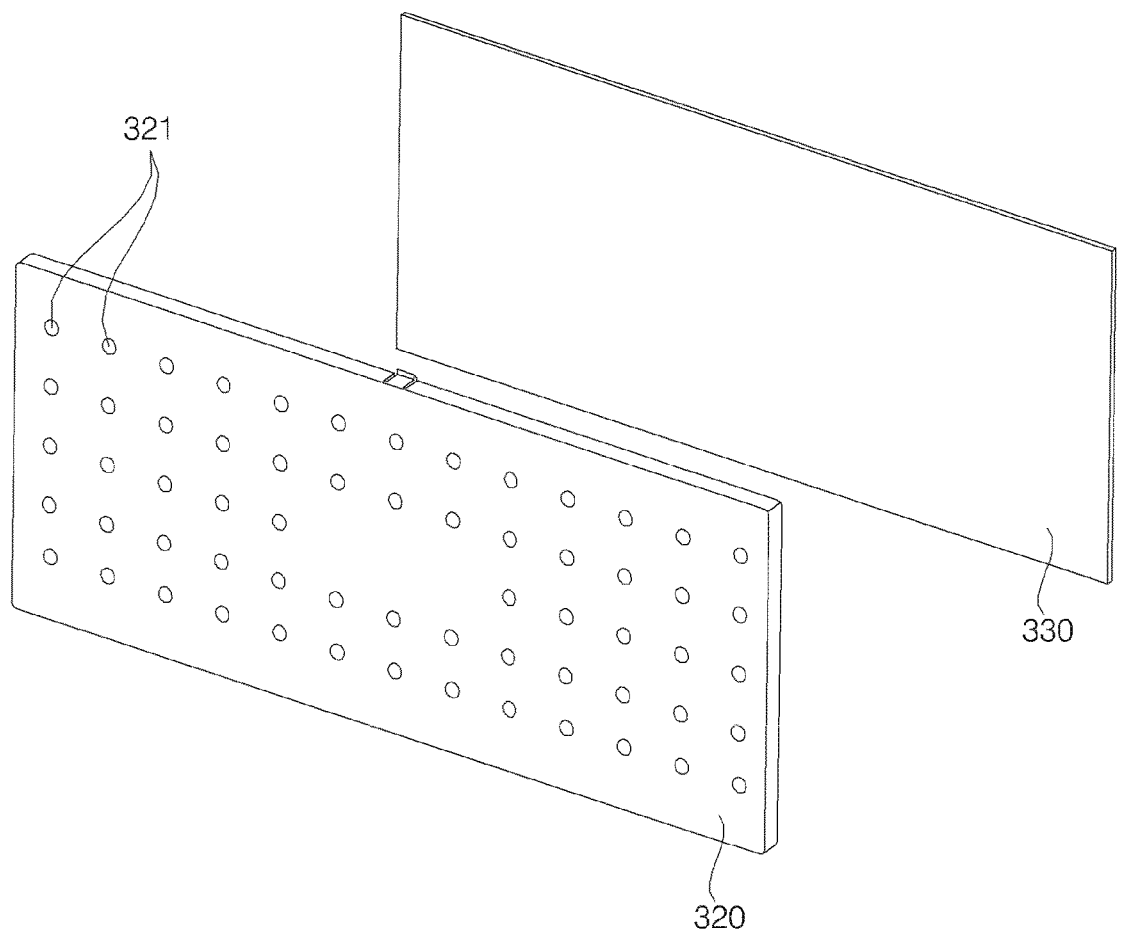
FIG. 8 is an exploded perspective view illustrating the first back plate and a first metal plate shown in FIG. 7.
Figure 9:
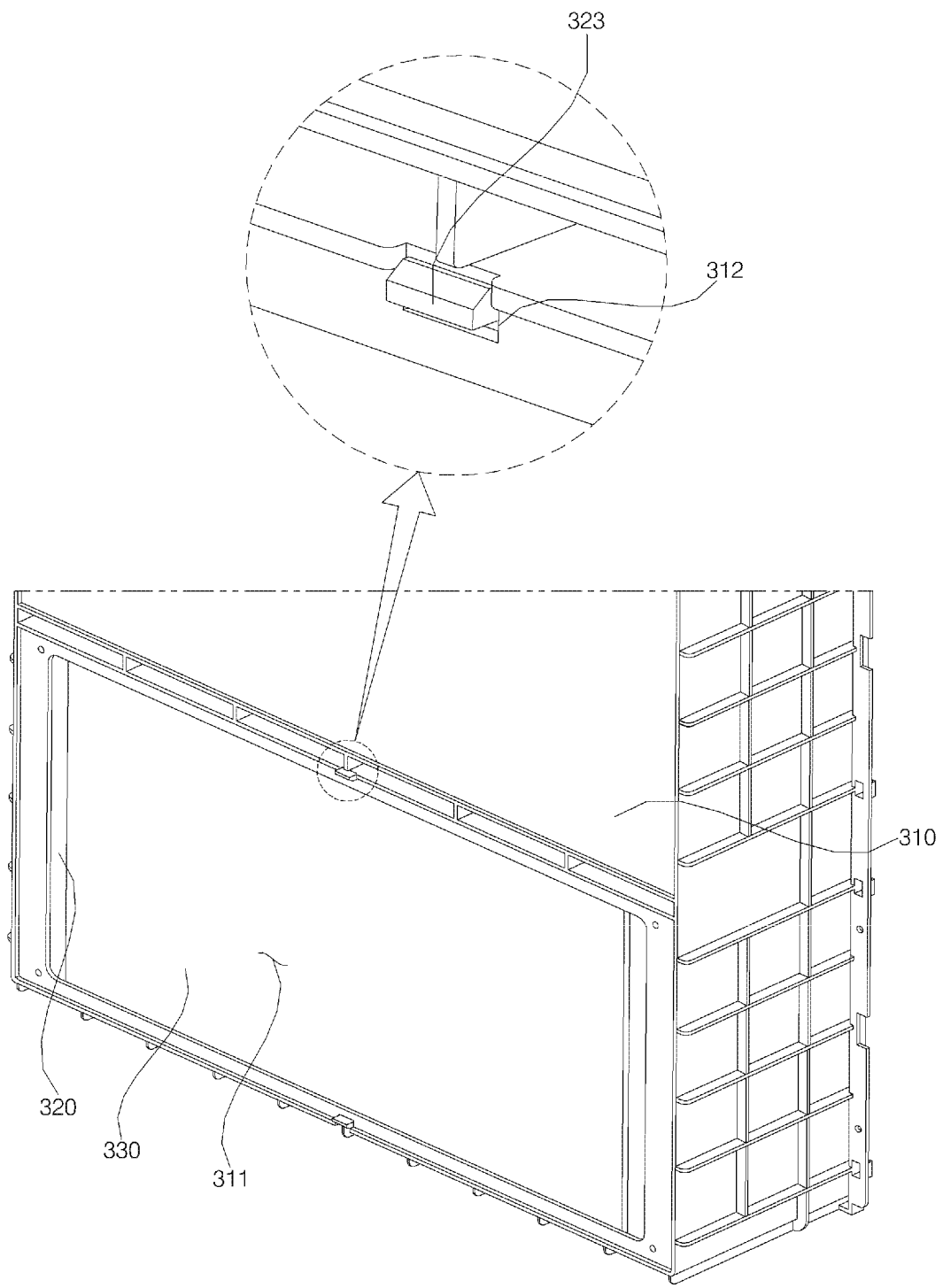
FIG. 9 is a partial enlarged view of FIG. 6.

FIG. 7 is a view illustrating a rear surface of a first back plate shown in FIG. 5, FIG. 8 is an exploded perspective view illustrating the first back plate and a first metal plate shown in FIG. 7, and FIG. 9 is a partial enlarged view of FIG. 6. A first metal plate 330 may be disposed at a rear surface of the first back plate 320. The first metal plate 330 may have a square shape corresponding to a shape of the first back plate 320. The first metal plate 330 may be configured to have a metallic material that is coupled to a magnet 342.

Further, a locking boss 322 locked with a rear surface of the outer case 310 through a locking member may be formed at an edge of the first back plate 320. In the present embodiment, since the first back plate 320 has a square shape, locking bosses 322 are formed at four edges of a rear surface of the first back plate 320, respectively.

Further, a hook protrusion 323 may be configured to be hooked to a rear surface of the outer case 310 between two locking bosses in the first back plate 320. In the present embodiment, one hook protrusion is formed at a center point between two locking bosses 322 of a top side of four locking bosses 322 and the other hook protrusion is formed at a center point between two locking bosses 322 of a top side. The hook protrusion 323 may be inserted into a hook hole 312 formed at a rear surface of the outer case 310 to be locked with the outer case 310. When a heater 350 to be described later is disposed at rear surfaces of the metal plates 330 and 335, the hook protrusion 323 prevents the back plates 320 and 325 from being convexly modified or warped.

Moreover, a first attachment groove 321 may be formed at a front surface of the first back plate 320. A plurality of attachment grooves 321 are horizontally and vertically spaced apart from each other by the same distance. Other desired patterns or arrangements particular to specific use are also possible.

Figure 10:
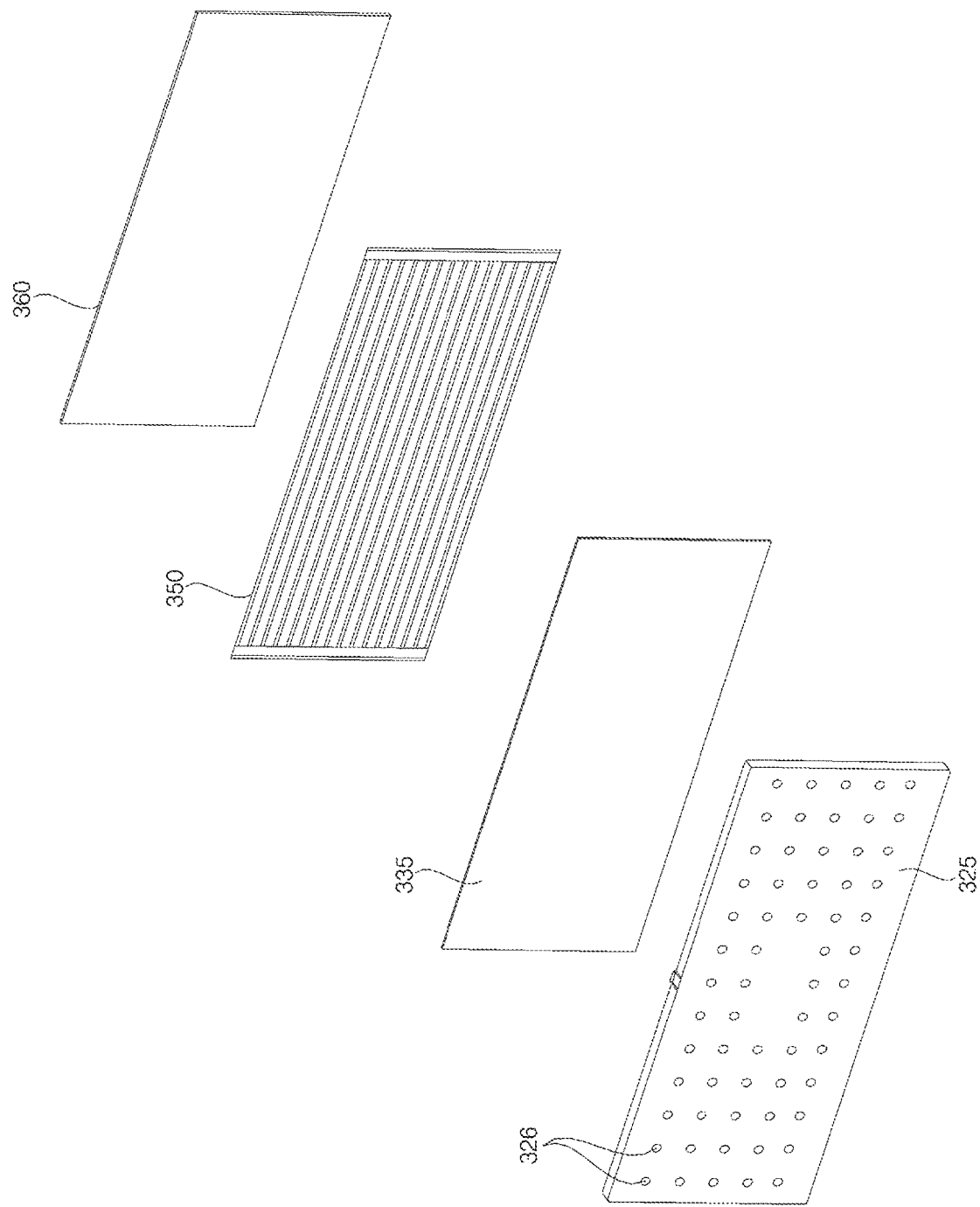
FIG. 10 is an exploded perspective view illustrating a second metal plate, a heater, and an insulation plate which are disposed in a rear direction of the first back plate and a first metal plate shown in FIG. 7.

FIG. 10 is an exploded perspective view illustrating a second metal plate, a heater, and an insulation plate which are disposed in a rear direction of the first back plate and a first metal plate shown in FIG. 7. Although only the first metal plate 330 is disposed at a rear surface of the first back plate 302, the second metal plate 335 may be disposed at a rear surface of the second back plate 325 and the heater 350 and the insulation plate 360 (or insulation layer/sheet) may be further disposed. The heater 350 may be disposed at a rear surface of the second metal plate 335 and the insulation plate 360 may be disposed at a rear surface of the heater 350.

The second back plate 325 may have substantially the same structure as that of the first back plate. The second metal plate 335 may have the same structure as that of the first metal plate 330. That is, a second attachment groove 326 may be formed at a front surface of the second back plate 325. A plurality of second attachment grooves 326 are horizontally and vertically spaced apart from each other by the same distance or intervals. Further, the second metal plate 335 may be configured to include a metallic material coupled to a magnet 352.

The heater 350 may include a surface electric heater and may have a square shape. The heater 350 converts electric energy into heat energy to heat the second metal plate 335. Accordingly, towels stored in the second storage space 302 may be dried and warmed by heat of the heater 350. If the towels are dried and warmed by heat of the heater 350, the user may have available warm towels for use after showers in the winter months.

The insulation plate 360 may have a square shape larger than the heater 350 to be disposed rearward of the heater 350 so that heat generated from the heater 350 is prevented from being transferring rearward. The insulation plate 360 may increase efficiency of the heater 350 in heating the second metal plate 335.

As described above, the heater 350 and the insulation plate 360 may be installed, and an opening hole 311 (or opening, recess) for emitting heat from the heater 350 may be formed at a rear surface of the outer case 310. The opening hole 311 may be shielded by the second back plate 325.

Meanwhile, while the above embodiment has described that the heater 350 is disposed at a rear surface of the second metal plate 335, the heater 350 may also be disposed at a rear surface of the first metal plate 330. That is, the heater 350 may be disposed in at least one of the first metal plate 330 or the second metal plate 335 to heat at least one of the first metal plate 330 or the second metal plate 335.

Figure 11:
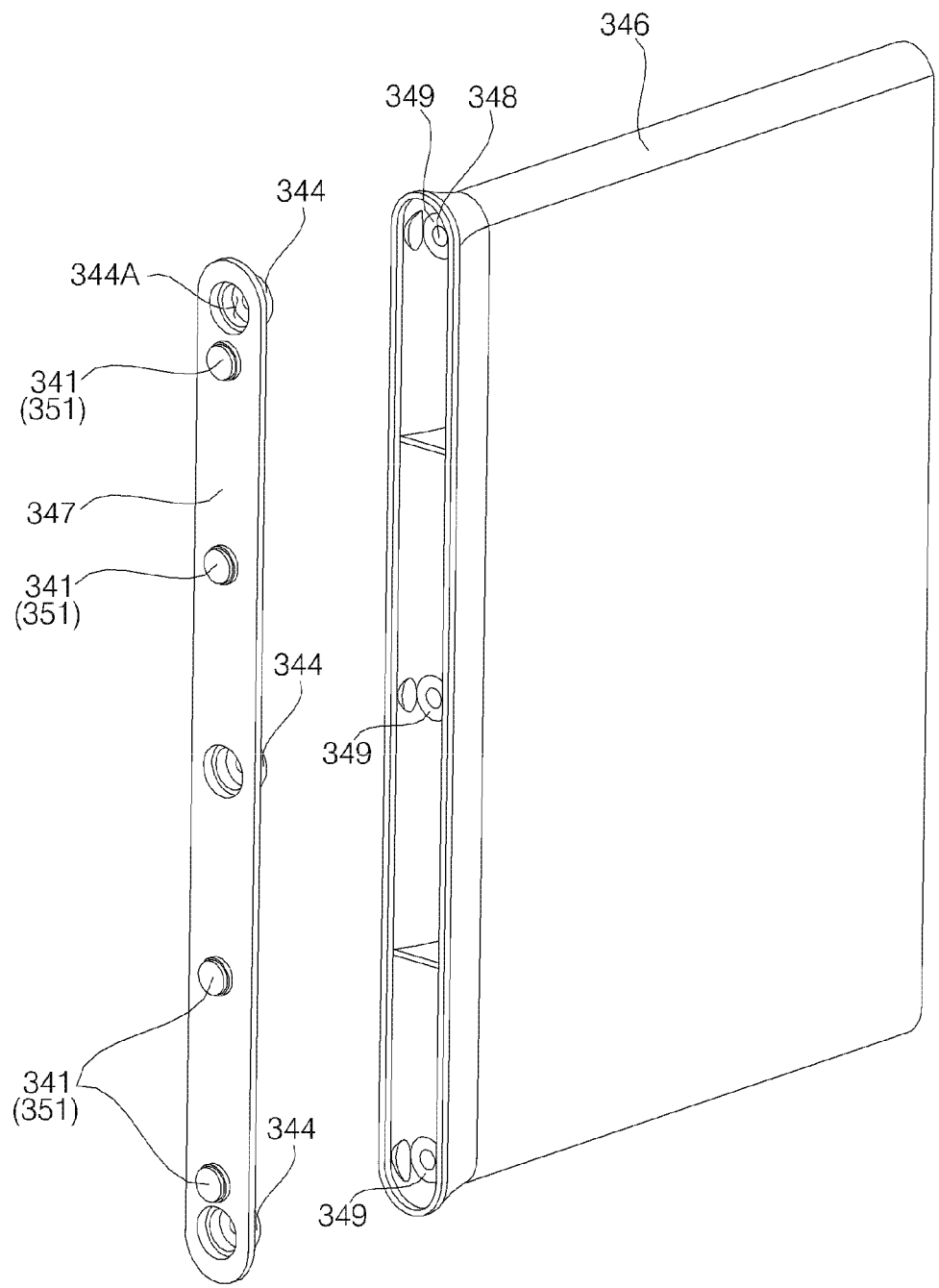
FIG. 11 is an exploded perspective view illustrating rear surfaces of a first partition and a second partition shown in FIG. 5.
Figure 12:
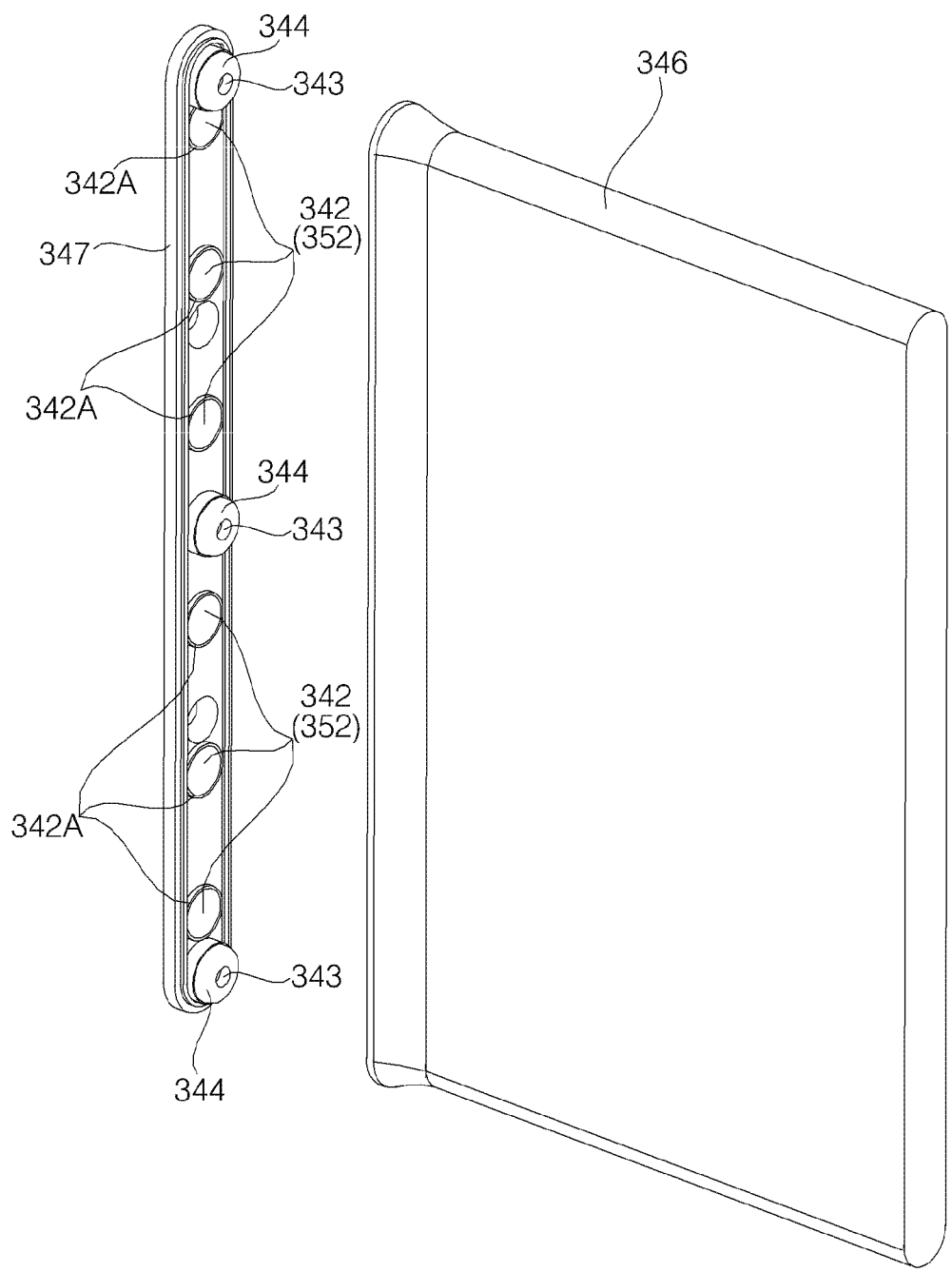
FIG. 12 is an exploded perspective view illustrating front surfaces of a first partition and a second partition shown in FIG. 5.

FIG. 11 is an exploded perspective view illustrating rear surfaces of a first partition and a second partition shown in FIG. 5, FIG. 12 is an exploded perspective view illustrating front surfaces of a first partition and a second partition shown in FIG. 5, and FIG. 13 is a view illustrating states of the first partition and the second partition attached to the back plate. The first partition 340 and the second partition 345 may have the same structure. That is, the first partition 340 may include a first attachment protrusion 341 inserted into the first attachment groove 321 which is formed at the first back plate 320. The second partition 345 may include a second attachment protrusion 351 inserted into the second attachment groove 326 which is formed at the second back plate 320. Moreover, the first partition 340 may include a first magnet 342 stuck to the first metal plate 330, and the second partition 345 may include a second magnet 352 stuck to the second metal plate 335.

When the first back plate 320 and the second back plate 325 are configured as one back plate 320,325, attachment grooves 321 and 326 may be formed at a front surface of the one back plate 320,325, and at least one of the first partition 340 and the second partition 345 may be provided to include attachment protrusions 341 and 351 and magnets 342 and 352. Since the back plates 320 and 325 are made of plastic materials, when inserting attachment protrusions 341 and 351 formed at the partitions 340 and 345 into attachment grooves 321 and 326 formed at the back plates 320 and 325, the partitions 340 and 345 may be attached to front surfaces of the back plates 320 and 325 by a force applied to the metal plates 330 and 335. As described above, since the partitions 340 and 345 include the attachment protrusions 341 and 351 and the magnets 342 and 352, the partitions 340 and 345 may be easily be mounted and interchanged, and the storage spaces 301 and 302 may be divided to have various sizes desired by the user.

A plurality of attachment protrusions 341 and 351 are apart from each other by the same distance as that of the plurality of attachment grooves 321 and 326 formed at front surfaces of the back plates 320 and 325 to be displayed the length of the partitions 340 and 345. Accordingly, as shown in FIG. 13, the partitions 340 and 345 may be vertically or horizontally disposed to divide the storage spaces 301 and 302 to be various sizes.

The partitions 340 and 345 include a partition body 346 of which a rear surface is open and a back cover 347 configured to shield the open rear surface of the partition body 346, coupled with the partition body 346 and in which the attachment protrusions 341 and 351 and the magnets 342 and 352 are disposed.

The partition body 346 is formed therein with a first locking part 349 having a first locking hole 348 at an open inside. The back cover 347 is formed to have a second locking part 344 corresponding to the first locking part 349. The second locking part 344 includes a second locking hole 343 at a position corresponding to the first locking hole 348. The second locking part 344 protrudes at a front surface of the back cover 347, and is inserted into the open inside of the partition body 346 to be disposed corresponding to the first locking part 349. A groove 344A (or recess) in which a head portion of a screw is inserted is formed at a rear surface of the second locking part 344 of the back cover 347. The screw is sequentially inserted into the second locking hole 343 and the first locking hole 348 to lock the first locking part 349 and the second locking part 344 so that the back cover 347 is coupled with the partition body 346.

A plurality of first locking parts 349 may be provided along a length of the partition body 346. A plurality of second locking parts 344 may be provided along a length of the back cover 347. In the present embodiment, three first locking parts 349 and three second locking parts 344 are provided. That is, one first locking part 349 is provided at an open inner top end of the partition body 346, one first locking part 349 is provided at an open inner bottom end of the partition body 346, and one first locking part 349 is provided at an open inner center of the partition body 346. Moreover, one second locking part 344 is provided at a front top end of the back cover 347, one second locking part 344 is provided at a front bottom end of the back cover 347, and one second locking part 344 is provided at a front center of the back cover 347.

The attachment protrusions 341 and 351 protrude from a rear surface of the back cover 347 and a plurality of attachment protrusions are provide along a length of the back cover 347. In the present embodiment, the total four attachment protrusions 341 and 351 are formed between two second locking parts in a rear surface of the back cover 347 in the unit of two attachment protrusions.

Magnets 342 and 352 may be inserted and disposed in the magnet insertion groove 342A which is formed at a front surface of the back cover 347. In the present embodiment, total six magnet insertion grooves 342A may be formed between two second locking parts 344 in a front surface of the back cover 347 in the unit of three magnet insertion grooves 342A, and the magnets 342,352 are inserted into the magnet insertion grooves 342A so that total six magnets are disposed.

As described above, the bathroom management apparatus according to the present disclosure may enable storage spaces 301 and 302 of function modules 300, 400, 500, 600, and 700 to be divided into various sizes by freely changing a position of a partition.

In addition, the storage objects stored in storage spaces 301 and 302 of the function modules 300, 400, 500, 600, and 700 may be dried and warmed by operating a heater.

A bathroom management apparatus is broadly described and embodied herein. A first objective of the present disclosure provides a bathroom management apparatus capable of dividing a storage space of a function module as various sizes.

A second objective of the present disclosure provides a bathroom management apparatus capable of drying and warming storage targets stored in a storage space of a function module.

According to an aspect of the present disclosure, there is provided a bathroom management apparatus including: a cabinet of which a front surface is open; a frame installed in the cabinet to reinforce stiffness of the cabinet; and a function module including at least one of a towel care module, a sterilizing module, a secret box module, a refrigerating module, and a charging module and mounted in the frame, wherein the function module comprises: an outer case configured to provide a storage space of which a front surface is open; a back plate inserted into the outer case to form a rear surface of the storage space, and an attachment groove being formed at a front surface at the back plate; a metal plate disposed at a rear surface of the back plate; and a partition including an attachment protrusion inserted into the attachment groove and a magnet stuck to the metal plate by magnetic force and to divide the storage space.

The bathroom management apparatus may further include a heater disposed at a rear surface of the metal plate to heat the metal plate.

According to the first objective of the present disclosure, a storage space of a function module may be divided with various sizes by freely changing a position of a partition.

According to the second objective of the present disclosure, the storage targets stored in a storage space of the function module may be dried and warmed by operating a heater.

Those skilled in the art will appreciate that the present disclosure may be carried out in specific ways other than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present disclosure.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A bathroom management apparatus comprising:
   a cabinet having an open front side;
   a frame installed in the cabinet to reinforce stiffness of the cabinet; and
   a function module including at least one of a towel care module, a sterilizing module, a secret box module, a refrigerating module, or a charging module, the function module being mounted in the frame,
   wherein the function module includes
      an outer case configured to provide a storage space having a front side that is open,
      a back plate provided inside the outer case to form a rear surface of the storage space, and a plurality of attachment grooves being formed at a front surface at the back plate,
      a metal plate disposed at a tear surface of the back plate, and
      a partition removably coupled to the front surface of the back plate to divide the storage space, wherein the partition includes a plurality of attachment protrusions configured for insertion into a set of the plurality of attachment grooves and a magnet coupled to the metal plate by magnetic force, wherein a total number of the attachment grooves in the set of the attachment grooves is less than a total number of the attachment grooves in the plurality of attachment grooves,
   wherein the plurality of attachment grooves are horizontally and vertically spaced at a prescribed interval such that adjacent ones of the attachment grooves are horizontally spaced by the prescribed interval and adjacent ones of the attachment grooves are vertically spaced by the prescribed interval, and
   wherein adjacent ones of the plurality of attachment protrusions are spaced at the same interval as the interval of the plurality of attachment grooves.

2. The bathroom management apparatus of claim 1, further comprising a heater disposed at a rear surface of the metal plate to heat the metal plate.

3. The bathroom management apparatus of claim 2, wherein an opening is formed at a rear surface of the outer case to emit heat from the heater.

4. The bathroom management apparatus of claim 2, further comprising an insulation plate disposed at a rear surface of the heater.

5. The bathroom management apparatus of claim 1, wherein the back plate includes two locking bosses configured to lock with a locking member provided on an inner surface of the outer case and formed at an edge of the back plate, and a hook protrusion configured to be hooked to the inner surface of the outer case between the two locking bosses.

6. The bathroom management apparatus of claim 1, wherein the partition includes
a partition body having a rear side that is open, and
a back cover configured to shield the open rear side of the partition body and coupled with the partition body, the plurality of attachment protrusions and the magnet being disposed on the back cover.

7. The bathroom management apparatus of claim 6, wherein the plurality of attachment protrusions are disposed on a rear surface of the back cover and the magnet is disposed on a front side of the back cover and enclosed within the partition.

8. The bathroom management apparatus of claim 1, further comprising a door mounted at the front side of the cabinet and configured to open and close the cabinet.

9. A bathroom management apparatus comprising:
a cabinet having an open front side;
a frame installed in the cabinet to reinforce stiffness of the cabinet; and
a function module mounted in the frame, the function module including at least one of a towel heater, a sterilizer, a lock box, a refrigerator, or a device charger, wherein the function module includes
an outer case configured to provide a storage space having a front surface that is open,
a function division plate inserted into the outer case to divide the storage space into a first storage space and a second storage space,
a first back plate provided inside the outer case to form a rear surface of the first storage space, and a first attachment groove being formed at a front surface at the first back plate,
a second back plate provided inside the outer case to form a rear surface of the second storage space, and a second attachment groove being formed at a front surface of the second back plate,
a first metal plate disposed at a rear surface of the first back plate,
a second metal plate disposed at a rear surface of the second back plate,
a first partition removably coupled to the front surface of the back plate to divide the first storage space, wherein the first partition includes a first attachment protrusion configured for insertion into the first attachment groove and a first magnet coupled to the first metal plate by magnetic force; and
a second partition removably coupled to the front surface of the back plate to divide the second storage space, wherein the second partition includes a second attachment protrusion configured for insertion into the second attachment groove and a second magnet coupled to the second metal plate by magnetic force.

10. The bathroom management apparatus of claim 9, further comprising a heater disposed at a rear surface of at least one of the first metal plate or the second metal plate to heat the at least one of the first metal plate or the second metal plate.

11. The bathroom management apparatus of claim 10, further comprising an insulation plate disposed at a rear surface of the heater.

12. The bathroom management apparatus of claim 11, wherein an opening is formed at a rear surface of the outer case to emit heat from the hearer.

13. The bathroom management apparatus of claim 10, further comprising a door mounted at the front side of the cabinet and configured to open and close the cabinet.

14. The bathroom management apparatus of claim 9, wherein the first back plate and the second back plate each include two locking bosses configured to lock with locking member provided on an inner surface of the outer case and formed at an edge of each of the first back plate and the second back plate, and a hook protrusion configured to be hooked to the inner surface of the outer case between the two locking bosses for the first back plate and the second back plate.

15. The bathroom management apparatus of claim 9, wherein a plurality of the first attachment grooves and a plurality of the second attachment grooves are horizontally and vertically spaced apart from each other at a prescribed interval, and
a plurality of first attachment protrusions and a plurality of second attachment protrusions are spaced apart from each other by the same interval as the plurality of first attachment grooves and the plurality of second attachment grooves.

16. The bathroom management apparatus of claim 9, wherein the first partition includes
a first partition body having a rear side that is open, and
a first back cover configured to shield the open rear side of the first partition body and coupled with the first partition body, the first attachment protrusion and the first magnet being on the first back cover.

17. The bathroom management apparatus of claim 16, wherein the first attachment protrusion is disposed on a rear surface of the first back cover and the first magnet is disposed on a front side of the first back cover and enclosed within the first partition.

18. The bathroom management apparatus of claim 9, wherein the first partition includes
a partition body of which a rear side that is open, and
a back cover configured to shield the open rear side of the partition body and coupled with the partition body, the second attachment protrusion and the second magnet being provided on the back cover.

19. The bathroom management apparatus of claim 18, wherein the second attachment protrusion is disposed on a rear surface of the second back cover and the second magnet is disposed on a front side of the second back cover and enclosed within the second partition.

20. A bathroom management apparatus comprising:
a cabinet having an open front side;
a frame installed in the cabinet to reinforce stiffness of the cabinet; and
a function module including at least one of a towel care module, a sterilizing module, a secret box module, a refrigerating module, or a charging module, the function module being mounted in the frame,
wherein the function module includes
an outer case configured to provide a storage space having a front side that is open,
a back plate provided inside the outer case to form a rear surface of the storage space, and an attachment groove being formed at a front surface at the back plate,
a metal plate disposed at a tear surface of the back plate, and
a partition removably coupled to the front surface of the back plate to divide the storage space, wherein the partition includes an attachment protrusion configured for insertion into the attachment groove and a magnet coupled to the metal plate by magnetic force,
wherein the back plate includes two locking bosses configured to lock with a locking member provided on an inner surface of the outer case and formed at an edge of the back plate, and a hook protrusion configured to be hooked to the inner surface of the outer case between the two locking bosses.

* * * * *